United States Patent
Bahar

(10) Patent No.: US 7,019,670 B2
(45) Date of Patent: Mar. 28, 2006

(54) ENHANCED PARKING METER UTILIZING USER IDENTIFICATION TECHNOLOGY

(76) Inventor: Reuben Bahar, 23708 Welby Way, West Hills, CA (US) 91307

(*) Notice: Subject to any disclaimer, the term of this patent is extended or adjusted under 35 U.S.C. 154(b) by 0 days.

(21) Appl. No.: 10/330,574

(22) Filed: Dec. 27, 2002

(65) Prior Publication Data

US 2003/0132840 A1 Jul. 17, 2003

Related U.S. Application Data

(60) Provisional application No. 60/343,527, filed on Dec. 31, 2001.

(51) Int. Cl.
*B60Q 1/48* (2006.01)

(52) U.S. Cl. .................... 340/932.2; 340/933
(58) Field of Classification Search ........... 340/932.2, 340/933, 937, 942, 995.1, 904, 905; 235/378, 235/384; 701/1, 2
See application file for complete search history.

(56) References Cited

U.S. PATENT DOCUMENTS

| | | | |
|---|---|---|---|
| 5,442,348 A | * | 8/1995 | Mushell .................. 340/932.2 |
| 5,659,306 A | | 8/1997 | Bahar |
| 5,845,268 A | * | 12/1998 | Moore .................... 340/932.2 |
| 6,275,169 B1 | * | 8/2001 | Krygler et al. .......... 340/932.2 |
| 6,340,935 B1 | * | 1/2002 | Hall ........................ 340/932.2 |
| 6,344,806 B1 | * | 2/2002 | Katz ....................... 340/932.2 |
| 6,526,335 B1 | * | 2/2003 | Treyz et al. ................... 701/1 |

* cited by examiner

*Primary Examiner*—Van T. Trieu
(74) *Attorney, Agent, or Firm*—Cahill, von Hellens & Glazer, P.L.C.

(57) ABSTRACT

An enhanced parking meter system utilizing user identification technology to achieve improved efficiencies in the enforcement and regulation of parking meters. A user and/or vehicle is identified by communication of user data into the parking meter system. If the meter becomes expired with the vehicle remaining in the parking space, a citation will be electronically processed, in accordance with the user data, and thereafter delivered to the user or vehicle owner. Recognition of the user and/or vehicle further enables the system to limit the individual's and/or vehicle's parking time in front of a particular meter or designated cluster of meter. This would help regulate traffic within a municipality district as well as prevent people from parking in a metered location for excessive periods of time.

54 Claims, 8 Drawing Sheets

ENHANCED PARKING METER UTILIZING USER IDENTIFICATION TECHNOLOGY

CROSS-REFERENCE TO RELATED APPLICATION

This application claims the benefit of U.S. provisional patent application Ser. No. 60/343,527 filed on Dec. 31, 2001.

BAKDGROUND OF THE INVENTION

The field of the invention is parking meters, and the invention relates more particularly to electronically enhanced parking meters.

Traditional parking meters have become a standard tool in municipality parking regulation. With the advancement of technology, cities are able to use electronic parking meters to achieve various efficiencies previously not attainable with conventional models. One significant achievement pertains to enforcement of parking violations. Wireless technology coupled with sensors and a microprocessor has allowed authorities to detect expired parking meters at the moment of expiration. This process is explained in U.S. Pat. No. 5,659,306, entitled "Expired Parking Meter Indicator" and has many advantages. First, the number of expired meter situations occurring for any given meter, at any given time, can be tracked and recorded. That figure, when compared to the number of citations actually written for the particular meter will indicate the efficiency of enforcement personnel. Additionally, data revealing when and where violations occur eliminates the need for meter maids to aimlessly circle a municipality block in hopes of visually locating expired parking meters. The result is a substantial saving and increase in the amount of revenue spent to monitor and enforce parking meters.

Despite such improvements, however, enforcement personnel must still spend tremendous resources in locating, arriving at, and citing expired parking meters. Included with this task is also a danger of dealing with individuals who become angry and sometimes violent upon receipt of a citation. Additionally, other problems such as meter feeding further add to the inefficient operation of parking meters. Currently, there is no full proof approach for limiting an individual's parking time at one or a designated cluster of parking meters throughout the day, week, month, or year. Although officers may monitor when a vehicle has entered and left a particular metered space, such an approach is time consuming and inefficient. This is because the officer would need to frequently visit the marked location to check if the parked vehicle has exceeded its allowable parking time. As such, individuals have often been able to park in the same metered space throughout the day so long as they kept the parking meter in an un-expired state.

BRIEF SUMMARY OF THE INVENTION

The present invention is for an enhanced parking meter system that utilizes user identification technology to achieve improved efficiencies in the enforcement and regulation of parking meters. The enhanced parking meter system may include, in addition to a parking meter and a parking space, a microprocessor coupled with a vehicle presence detector to initiate a parking control cycle upon detection of a vehicle in the parking space. Element(s) for receiving payment would allow the user to purchase parking time, while element for receiving data (e.g. "user data") would attempt to recognize data related to the user of the meter. A timing element would further ascertain when the meter is expired and if the specified user and/or vehicle has exceeded the allowable parking time. If conditions indicate an expired meter situation or prohibit parking, the meter enters into a time out phase. If the user's data was provided to the parking meter, a citation would be recorded, processed, and delivered to that individual. Where a user's data has not been provided, an enforcement officer may be dispatched to cite the vehicle. A meter reset element would initiate a new parking control cycle after the violating vehicle has left the parking space.

DETAILED DESCRIPTION OF THE PREFERRED EMBODYMENTS

The present invention is for an enhanced parking meter system utilizing user identification technology to achieve improved efficiencies in the enforcement and regulation of parking meters. While the term "vehicle" generally denotes reference to an automobile, it may likewise refer to a motorcycle, truck, bicycle, or other known type of transportation device. Additionally, the term "user", as used herein and in the claims, refers to any individual who has or is using a parking meter. It is also noteworthy that various functional elements for the enhanced parking meter system disclosed below may comprise an independent enhancement unit that can be installed onto an existing mechanical or electronic parking meter. Alternatively, the elements may be manufactured into a new and intact parking meter unit(s). Either way, however, the enhanced parking meter system of this present invention may be utilized by both public and/or private entities to achieve desired parking efficiencies. Given this, it is further notable that while a parking citation is generally issued by a government entity (e.g. municipality), it may likewise be issued by a private entity. Both may independently determine the fine amount and issuance guidelines that would best accord to their intended use of the enhanced parking meter system.

Figure 1:
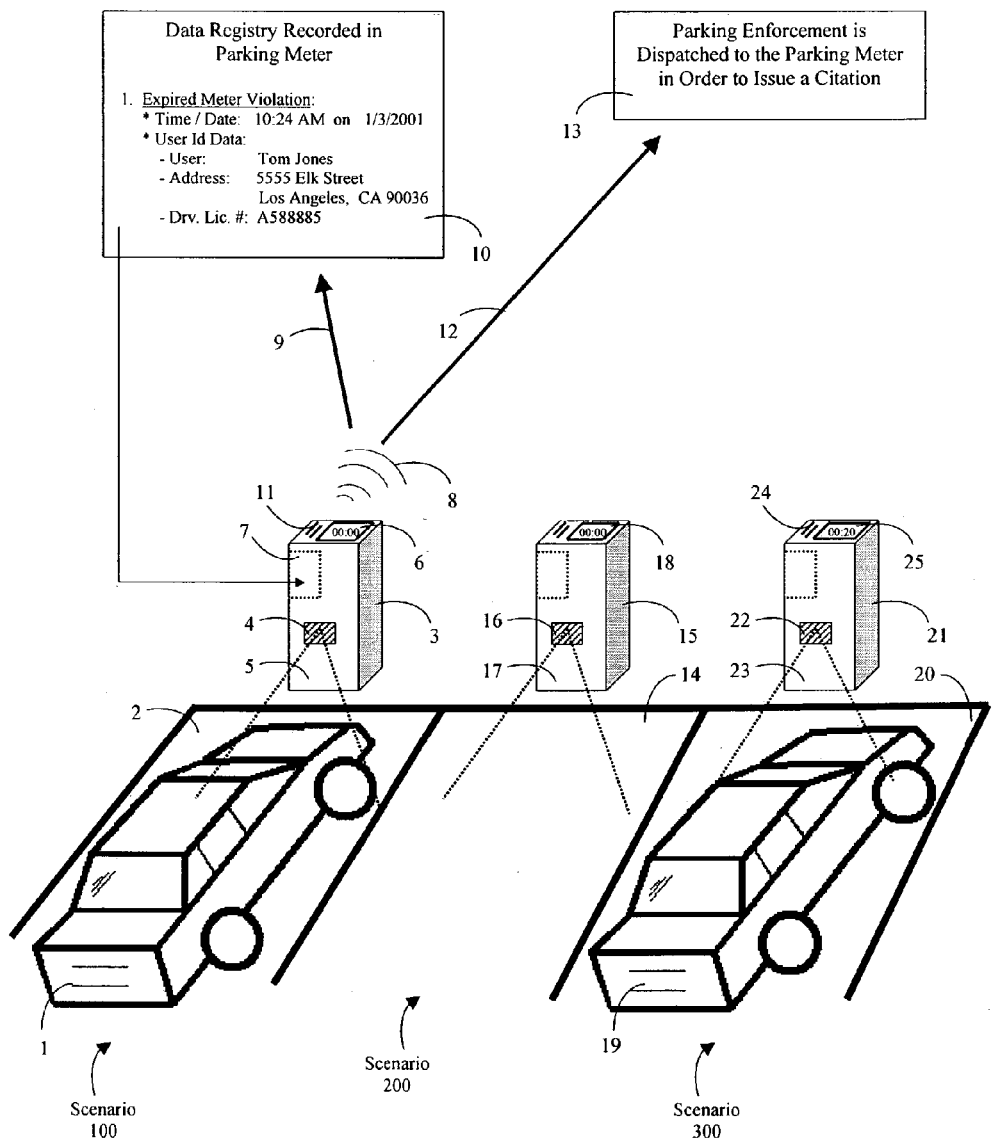
FIG. 1 is an overview diagram depicting three scenario embodiments in which the enhanced parking meter system of the present invention may function.

Referring now to FIG. 1, Scenario 100, vehicle 1 enters the parking space 2 and is shown as parked. Vehicle presence detector 4, located on parking meter 3, detects the presence of vehicle 1 and initiates a new parking control cycle. It is noteworthy that the vehicle presence detector 4 has a zone of detection 5 which can be directed to detect any vehicle present within the parameters of parking space 2. Liquid crystal display (LCD) 6 displays the amount of parking time left in the parking meter 3. As shown in the diagram, LCD 6 displays that there is 00:00 parking time left in the parking meter 3, thereby indicating that it is expired. There may be several reasons why the parking meter 3 would be expired. For example, the user may refuse to purchase parking time or alternatively, time that was already purchased may have expired with the vehicle remaining parked in the metered space. Additionally, as will later be discussed in detail, the parking meter may refuse to sell a particular user additional time as a result of them or the vehicle used having exceeded the maximum allowable parking time limit. Regardless of the reason, an expired parking meter with a vehicle present in its metered space will enter a time out phase after expiration.

Returning to FIG. 1, Scenario 100, expiration of the meter 3 coupled with the vehicle's presence in the parking space 2 will result in a time out phase. This means that the vehicle 1 is in violation, whereby a citation may be issued in either one of two ways, depending on whether the user and/or vehicle was identified by the meter. If the user and/or vehicle was identified by the parking meter 3, a citation will be processed and delivered to the user and/or vehicle without the need for an enforcement officer to arrive at the meter 3. In a preferred embodiment, the parking meter 3 would correlate the user's data with data pertaining to the parking violation and generate a citation record/file. The citation record/file may thereafter be transmitted 8 to an area supervisor 35, FIGS. 3 and 4 (which would later be discussed in detail), and stored on its 35 data storage element until it is extracted by enforcement personnel. After extraction, enforcement personnel may generate a citation from the extracted data and deliver it to the identified user or vehicle owner. Extraction may be done through a download sequence initiated at the area supervisor location or via a remote data transfer to a remotely situated central computer station 39 (FIG. 4), using wired or preferably, wireless technology, or a combination of the two. It is noteworthy that a remotely situated central computer station may be set up to transact with the parking meter(s) and perform various operational and managerial functions. These include, but are not limited to communicating (via wired or wireless technology, or a combination of the two) with elements of the enhanced parking meter of this invention (e.g. parking meter(s), area supervisor(s), mobile computers, etc.), programming the meter(s), collecting and processing of parking meter citation data, collecting statistical data from the meters, monitoring the operational status of the meter(s) (including functionality and acts of vandalism), etc.

Returning to the previous discussion, processing of the citation may also be accomplished by storing the citation file on the data processing hardware 7 (which will be later discussed in detail) of the parking meter 3 until it is similarly extracted by enforcement personnel, converted into a citation, and delivered to the identified user or vehicle owner. In yet another embodiment, the user's data may be transmitted to the remotely situated central computer station 39 with instructions indicating that a citation is to be issued in accordance with the particulars of the parking violation (e.g. time, date, reason). Despite these examples, it is of course, understood that there are various other methods for processing the citation which are best known to those skilled in the art, and thus, need not be mentioned herein.

An example of a citation data record/file issued for an expired meter violation is shown in FIG. 1. As previously mentioned, vehicle 1 is parked in front of an expired parking meter 3 in parking space 2. As such, citation record 10, denoted by reference arrow 9, is generated in accordance with the communicated user data corresponding to "Tom Jones", located at "5555 Elk Street, Los Angeles, Calif. 90036", with drivers license number "A588885". Additionally, the time (10:24 AM) and date (Jan. 3, 2001) of the violation is further noted in the citation data record/file.

It is noteworthy that user data may include, but is not limited to the name, address, telephone number, fax number, e-mail address, drivers license number, social security number, fingerprint impression, DNA code, biometrics, sex, age, and other particulars that can personally identify the user and/or vehicle utilized by the user. Additionally, user data may further include data that identifies the vehicle driven by the user, such as the vehicle license plate number, VIN number, registration particulars, vehicle make, model, year, color, etc. Third, user data may include data pertaining to a personal or company financial account (e.g. a bank account, credit card account, or debit account) that is related to the user. Furthermore, data containing history of the vehicle driven by the user or of the user themselves such as medical condition(s), criminal record(s)/conviction(s), parking permits and similar type unpaid or paid for parking exemptions (e.g. restricted district parking permit which includes data such as permit number, validity status, period of validity, etc.), current and past job description, and recreation particulars (e.g. shopping activities, sports activities, hobbies, likes, dislikes, etc.) may likewise qualify as user data. While various types of user data (as mentioned above) may identify a user, that which uniquely pertains to the user (i.e. drivers license number, social security number, fingerprint impression, etc.) is of particular significance. This is because such data offers the most precise and accurate method of identifying the user. Data pertaining to the parking violation, on the other hand, may include, but is not limited to time, date, and location of the violation. Additionally data describing the nature of the parking violation may further qualify. This includes, but is not limited to expiration of the parking meter resulting from failure to purchase allowable parking time, expiration of the parking meter after the maximum allowable parking time limit for a user has been reached, and unauthorized parking during a restricted time or date.

The user data can be contained on a variety of elements (hereinafter, "identification element(s)") that are capable of storing data and communicating it to and from the parking meter. One type of an identification element is readable cards such as those equipped with a magnetic strip or electronic "smart" chip (i.e. smart cards). For example, a pre-paid parking card, credit/debit card, or drivers license can be programmed with the user data, especially at the time it is issued. Additionally, electronically operated devices capable of communicating data to and from the parking meter or its integrated network are further contemplated. These identification elements may utilize either wired or preferably, wireless technology (e.g. radio frequency, infrared transmission) for communication of data. Furthermore, they may either be hand held and/or resident on the user's vehicle. For example, a mobile transmitter, cellular telephone, or hand-held PC may utilize radio frequency technology to establish a communication link with the meter. User data resident on either the transmitter, cellular phone, or hand-held PC may thereafter be sent to and stored by the meter or its integrated network. In one scenario, a radio frequency transmitter (e.g. resident in the user's vehicle) may automatically establish a communication link with the meter when it comes within a certain distance to the meter. Thereafter, the user data which is stored in the transmitter may be automatically communicated to the meter. It is noteworthy that while communication of the user data to the meter will generally require user interaction with the meter, it may also be done automatically (without the user's interaction) by the identification element (as is the case in the example above).

Similar to the previous example, a cellular telephone may also be used to transmit user data to the meter or its integrated network. There, the user data can be referenced to a particular parking cycle for a particular meter. If the meter becomes expired during the active parking cycle, a citation for the user or vehicle owner would be processed by the central computer station 39. This would be done by correlating the user data to data pertaining to the violation which occurred during the given parking cycle. Finally, a user's genetic elements such as a fingerprint, DNA, or biometric imprint may likewise serve as identification elements capable of communicating user data. Genetic identification elements may be communicated directly into the parking meter (e.g. by physically placing a fingerprint on the meter's fingerprint scanner) or may be stored on a mobile device capable of communicating with the meter (e.g. smart card containing the fingerprint data). It is of course, understood that there are various other identification elements that can store and communicate the user data to the parking meter and/or its integrated network which are best known to those skilled in the art, and thus, need not be mentioned herein.

It is noteworthy that the identification element may likewise contain or lead to a payment source for purchasing parking time from the meter 26. Allowing user data and payment to be accessed from the same identification element is not only efficient, but also convenient. Such is the case with a pre-paid parking card, mobile transmitter, or cellular telephone which can each be programmed with the user data and any amount of parking time payment the user wishes to purchase. Where parking time payment is not contained on the same identification element, user data, in itself, may lead to the same end result. For example, user data such as a credit account number may be communicated to the meter 26. A link to the user's payment account may thereafter be automatically established which would enable the user to purchase an allowable amount of parking time from the meter 26.

Preferably, a prepaid parking card is used to communicate the user data since such an identification element is inexpensive and easily made available through various outlets, such as retail stores, government offices (e.g. post office), the internet, mail order, and parking facilities (e.g. parking lots). The card may be pre-programmed with a predetermined amount of parking time or left open to be programmed with any desired parking time upon purchase. Furthermore, this card may be refilled with additional parking time after consumption of the initial time purchased. It is noteworthy that upon first purchase, the user may be required to enter their user data prior to issuance of the card (e.g. drivers license number). Since this card is able to retain data, the need for the user to re-enter their user data, after having done so once, is eliminated. A computer capable of reading and recording data onto the prepaid card will provide element(s) for programming the card with the desired parking time and user data. Payment for purchased parking time will be accepted and retained by the computer until it is emptied by collection personnel. The computer may be made available to the user in the form of a payment receiving vending machine such as a Lexis Systems® pay station or alternatively, the card may be sold and programmed by qualified sales personnel at any designated sales outlet. In the event of loss, misplacement, or theft of the prepaid parking card (or any of the other mentioned identification elements containing the user's data) unauthorized use can be prevented by reporting the incident to parking enforcement. They, in turn, would mark that identification element as unauthorized and dispatch an enforcement officer to the metered location if its use is ever detected (e.g. through an expired meter situation).

As previously mentioned, once the citation is processed, it may be delivered to the violator or owner of the vehicle in violation for collection of the due penalty fees. Preferably, delivery of the citation is accomplished via the mail, but may likewise, be sent via electronic methods such as e-mail and/or fax. Additionally, the citation may also be delivered by the meter itself if it is equipped with a printer. In this respect, the citation, once processed (e.g. by the meter), would be printed by a parking meter printing element and left in an appropriate compartment (e.g. slot in the meter housing) for the user. A message (e.g. on the meter's LCD) informing the user of the issued citation may thereafter be displayed for them to claim the citation upon arrival to their vehicle. It is notable that where a user's data contains information related to a financial account (e.g. credit/debit card account), the citation fee may be automatically debited from that account. A statement may thereafter be sent to the owner of the financial account informing them of the parking violation and the corresponding fines debited from their account.

Issuance of a citation in the above manner is made possible by virtue of the parking meter and its integrated system having identified the current user and or vehicle. The user's data which is communicated into the meter will provide the needed information for processing and issuing a parking citation when one is warranted. Accordingly, there is no need for a parking enforcement officer to physically arrive at the meter in order to issue a citation. This in itself will save a substantial amount of resources routinely spent to arrive at a metered location and cite a vehicle. Additionally, this system will decrease the amount of warranted, yet missed citations that result from an officer's late arrival at the metered location.

Various incentives may be established to entice a user to communicate their user data into the parking meter. One strong incentive pertains to the cost of a citation. For example, the same violation may mandate 200% the normal fine amount when an officer physically arrives at the meter then would be the case if it was electronically processed and mailed to the user. Another incentive may pertain to whether the user is allowed to park at the meter altogether. For instance, if the parking meter cannot identify the user or the vehicle they are utilizing, it may refuse to sell the user any parking time. If the user thereafter insists on parking in the metered space, an enforcement officer will be dispatched and issue a citation when the meter is expired. Finally, other incentives such as a reduction in the parking rate, free meter time, or other "earned" benefits may also be offered to those who communicate their user data into the parking meter.

It is contemplated that situations will emerge where the parking meter would be unable to identify its current user and/or associated vehicle. Failure to identify a user and/or the vehicle they are utilizing may be caused by a number of reasons. These include refusal by the user to communicate their user data, communication of incomplete or incorrect user data, meter malfunction, etc. In such a case, a parking enforcement officer may have to be dispatched to the metered location to issue a citation, repair the meter, or otherwise, deal with the matter. As shown in FIG. 1, scenario 100, parking meter 3 has data card reader 11 which is capable of reading user data from prepaid parking cards and the like. Assuming that the user of vehicle 1 did not communicate their prepaid parking card into data card reader 11 of parking meter 3, the meter will enter a time out phase (given its expired status). As is traditional, the enforcement officer may locate the expired meter 3 simply be virtue of conducting sweeps throughout their patrol route. Alternatively, the officer may be electronically dispatched 13, as indicated by arrow 12, FIG. 1, to the location of the parking meter 3 as mentioned in U.S. Pat. No. 5,659,306, entitled, "Expired Parking Meter Indicator".

As described in U.S. Pat. No. 5,659,306, initiation of a time out phase will cause the parking meter 3 to generate an output signal disclosing the location of the meter and its expired status. The output signal can be transmitted via wired or preferably, wireless technology and is receivable by an enforcement officer. Preferably, the signal is sent directly to an enforcement officer via a mobile hand held computer which is kept in their possession 38. Alternatively, the signal may be sent to a remotely situated central computer station 39 and dispatched (e.g. via radio) to the officer in the field. In this manner, enforcement of meter violations can still be handled efficiently despite the meter's 3 inability to identify its current user and/or the vehicle they are utilizing.

Returning to FIG. 1, a second parking cycle is shown in scenario 200. In that example, parking space 14 is unoccupied by a vehicle. This state is acknowledged by the inability of the meter presence detector 16 to detect a vehicle situated in its zone of detection 17. The fact that the meter 15 is expired with 00:00 18 parking time remaining will not cause it to enter a time out phase since the parking cycle is inactive. As such, the meter will remain idle until a vehicle enters space 14 and begins a new parking cycle.

A third parking cycle is shown in FIG. 1, scenario 300. There, a vehicle 19 is parked in parking space 20 and in front of parking meter 21. Presence of vehicle 19 is detected by the parking meter 21 by virtue of the vehicle 19 being in the zone of detection 23 of the vehicle presence detector 22. By communicating their prepaid parking card into the meter data card reader 24, the user purchased parking time, as indicated by 00:20 time remaining on the LCD 25. Vehicle 19 may remain parked in space 20 until expiration of the time remaining, at which point, a time out phase will be initiated. Thereafter, a citation will be electronically processed and delivered to the user or vehicle owner (if user data was adequately provided) or (if not) an enforcement officer may be dispatched to the parking meter 21.

Figure 2:
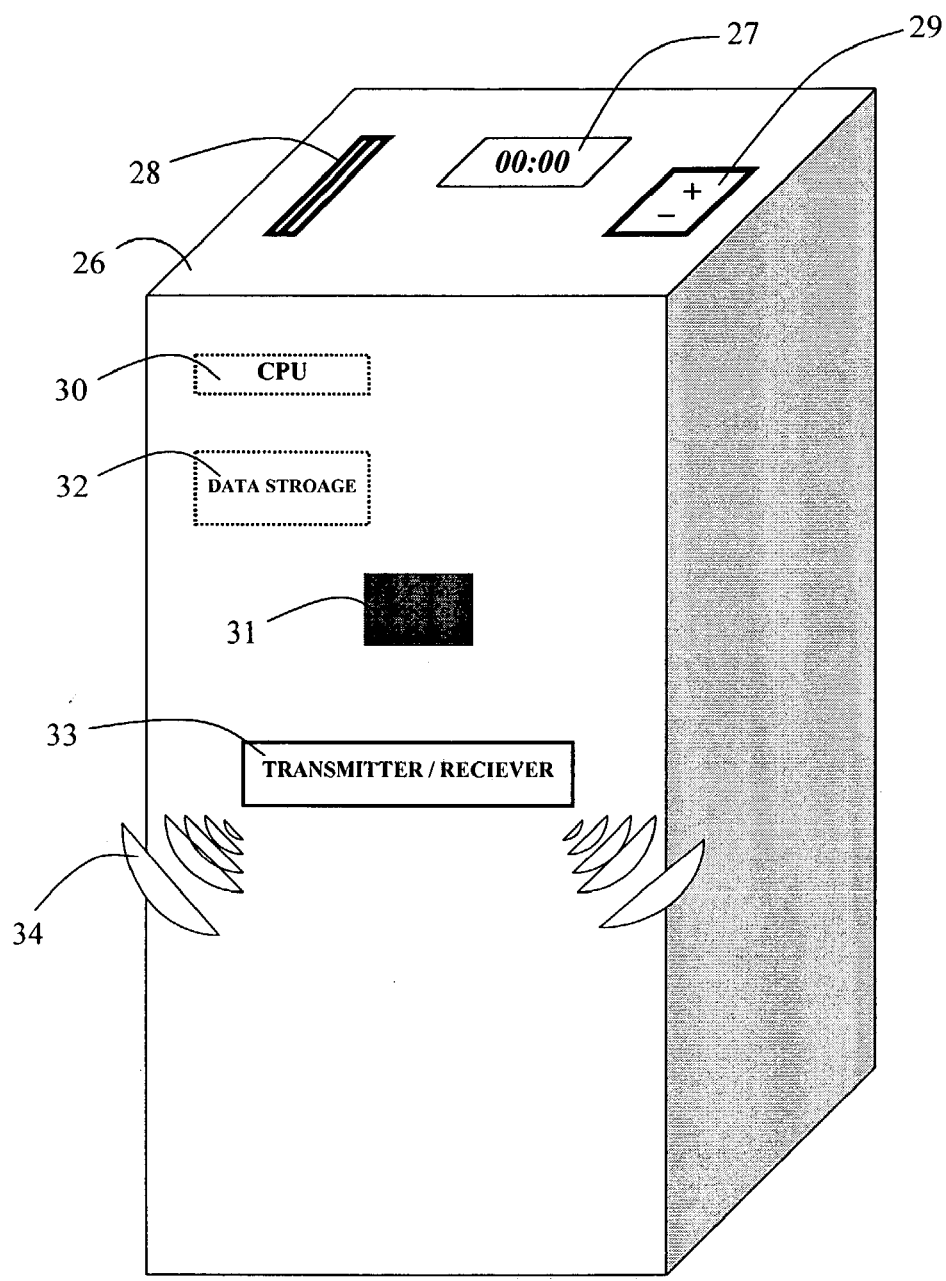
FIG. 2 is a perspective view of one embodiment of an enhanced parking meter system of the present invention.

One embodiment of the parking meter is shown in FIG. 2 diagrammatically and indicated generally by reference character 26. Parking meter 26 may include a liquid crystal display (LCD) 27 which is used to display various types of informative data. This data may include, but is not limited to data pertaining to a parking cycle such as the amount of parking time left in the meter, the payment (whether in currency or unit denominations) made to the meter, data stored on the identification element (e.g. user data and remaining payment credit), the meter's functionality status (e.g. "active", "failure"), parking status (e.g. "occupied", "expired", "vehicle cited"), benefits made available to the user (e.g. user "earned" benefits), advertisements, etc. It is further contemplated that other types of data display screens such as pixeled light displays and the like may be utilized instead of or with the LCD 27 for displaying data and/or warning messages.

As previously mentioned, parking meter 26 may also be equipped with an element (hereinafter, "data receiving element(s)") capable of accepting data (e.g. user data) from a user. Preferably, this element is a data card reader 28 which is capable of reading prepaid parking cards, credit cards, drivers licenses, and the like. Other data receiving elements that are capable of receiving data (e.g. user data) from a user are likewise contemplated. These include mechanisms (e.g. receivers) that can communicate through wired and/or wireless technology such as radio frequency or infrared data transfer. Additionally, mechanisms (e.g. scanners) that are capable of recognizing a user's genetic characteristics such as a fingerprint, DNA, or biometric imprint may likewise be implemented.

As previously mentioned, in a preferred embodiment, both the user data and the payment for parking will be contained on the same identification element (e.g. a pre-paid parking card). Additionally, it is likewise contemplated that the data receiving element(s) (e.g. data card reader 28) may also-receive payment for parking at the meter 26. Configuration in this manner will enable a user to interact with the meter 26 more efficiently then would otherwise be the case. Whether combined with the data receiving element(s), the element for receiving payment will provide a payment amount signal that is responsive to a payment made by a user of the meter 26. A timing element may further be interconnected with the payment receiving element. This will enable the timing element to register an amount of time on the meter 26 that corresponds to a valid payment made by the user. It is noteworthy that where the data receiving element(s) and payment receiving element(s) are separate entities, traditional elements for accepting payment may be used. For example, the meter 26 may have a coin slot (not shown) for accepting payment. It would also provide a payment amount signal upon payment made and would furthermore, be responsive to a timing element resident on the meter 26.

Electronic selection control element 29 may further be included on the parking meter 26 for allowing a user to manipulate various settings affecting their parking cycle. For example, control element 29 may be used to select the amount of parking time a user wishes to purchase from the meter 26. Similarly, it may also allow the user to conduct a transaction for buying new or additional parking time/credits on the user's identification element, such as a prepaid parking card.

As further shown in FIG. 2, parking meter 26 may be equipped with data processing hardware 30, 31, 32, 33 for initiating, controlling and/or processing a parking cycle. Data processing hardware may include, but is not limited to the following component elements: i. Data processing element such as a microprocessor/central processing unit (CPU) 30 which processes data and interfaces with the various component elements of the parking meter 26; ii. Vehicle presence detector 31 which detects the presence of a vehicle in the metered parking space. Vehicle presence detector 31 is likely interconnected with the meter timing element which will be activated when the detector 31 indicates the presence of a vehicle in a parking space. Preferably, vehicle presence detector 31 will distinguish between vehicles and other entities (e.g. humans/pets) in order to prevent false triggering of a new parking cycle. Vehicle presence detector 31 may utilize infrared, ultrasonic, sonar, photoelectric, or other technology best known to those skilled in the art. It is noteworthy that where the meter 26 is not equipped with a detecting sensor, the presence of the user's vehicle may also be detected by virtue of the user's interaction with the meter 26 (e.g. communicating their user data into the meter, purchase of parking time, etc.); iii. Data storage element 32, such as memory modules and/or hard disk drive which stores data; and iv. Data transceiver 33 which transmits and/or receives data to and from the parking meter 26. Data transceiver will allow the parking meter 26 to communicate with other electronic devices such as identification element(s), mobile hand held computers, an area supervisor(s) 35 (as will be discussed later), a remotely situated central computer station 39, etc. Data transceiver 33 may utilize various data transfer technology including wired and/or wireless methods (e.g. infrared and/or radio frequency), and preferably communicates via wireless technology 34, such as that illustrated in FIG. 2. Data communicated to and from the parking meter may include, but is not limited to user data, expired parking meter warning signals (e.g. initiation and negation of time out phase signal), citation data record(s)/file(s), processed citations, parking time allowance for a particular user, parking time status for a particular user, parking meter functionality status, advertisements, parking meter programming data, generated statistics pertaining to ongoing parking cycles, etc. Generated statistics pertaining to ongoing parking cycles that occur during a day, week, month, or year may include, but are not limited to, the amount of vehicles parked at the meter 26, the amount of expired meter situations, the amount of citations issued, the amount of citations missed, the amount of revenue received, the amount of identified users of the parking meter 26, the identity of identified users of the parking meter 26, the amount of unidentified users of the parking meter 26, the cumulative and average amount of time in which the meter 26 is occupied, the cumulative and average amount of time in which the meter 26 is unoccupied, meter 26 functionality status, etc.

It is notable that the parking meter 26 can be programmed to allow for an "enter" grace period during which a user may buy parking time upon initial arrival at the meter 26. In other words, the process(s) for issuing a citation (e.g. time out phase) will not initiate until a predetermined "enter" grace time has lapsed from the beginning of a new parking cycle. This way, a user will have sufficient time to communicate their user data and/or make payment to the parking meter 26 upon arrival into the parking space. It is also noteworthy that in situations where the time on the meter expires just as the user attempts to leave the metered space, a citation may likewise be unwarranted. As such, the parking meter 26 may further be programmed to allow for an "exit" grace period after expiration of the meter 26. Only after the "exit" grace period has ended coupled with the presence of the vehicle in the metered space, would a time out phase initiate from the expired meter. This will give the user enough time to move their vehicle out of the parking space and avoid an unwarranted parking citation.

Figure 3:
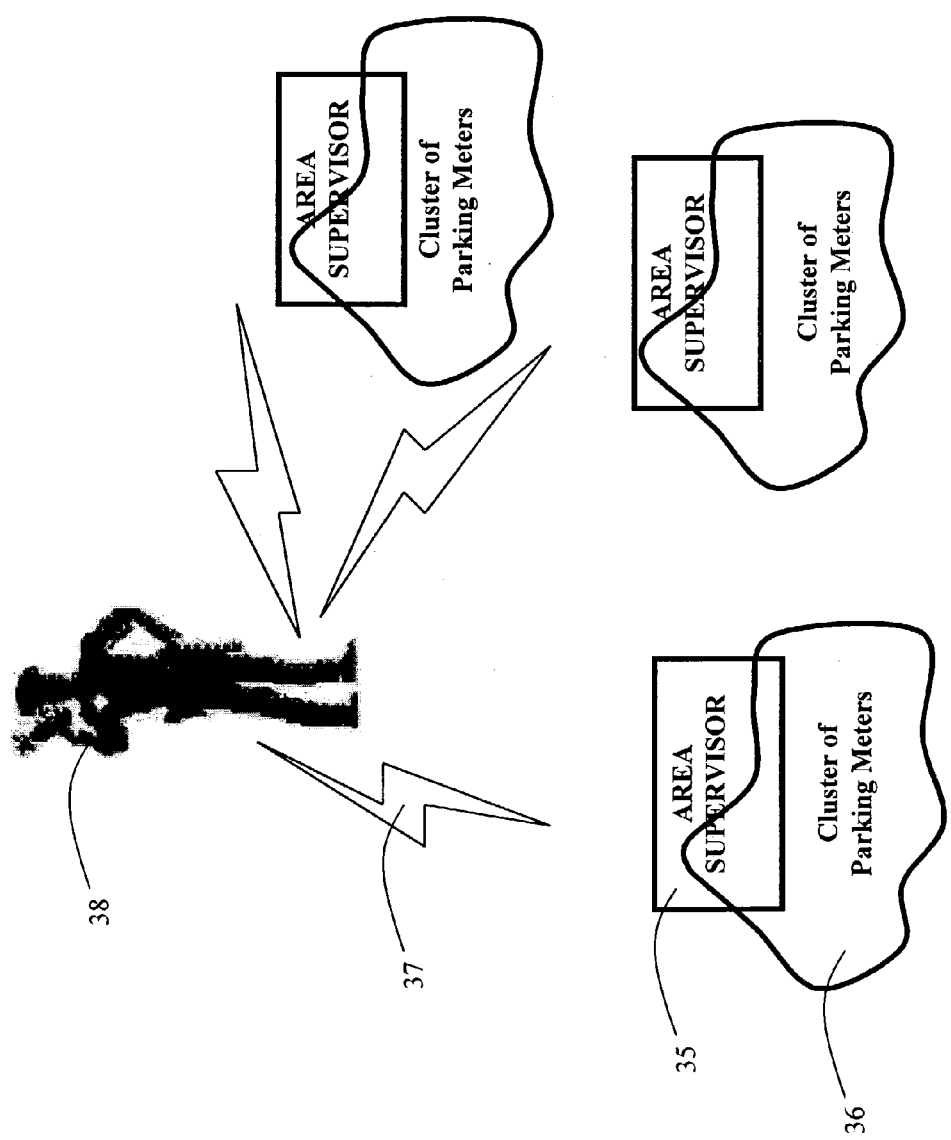
FIG. 3 is an overview diagram of one embodiment in which a parking enforcement officer may communicate with the enhanced parking meter system of the present invention.
Figure 4:
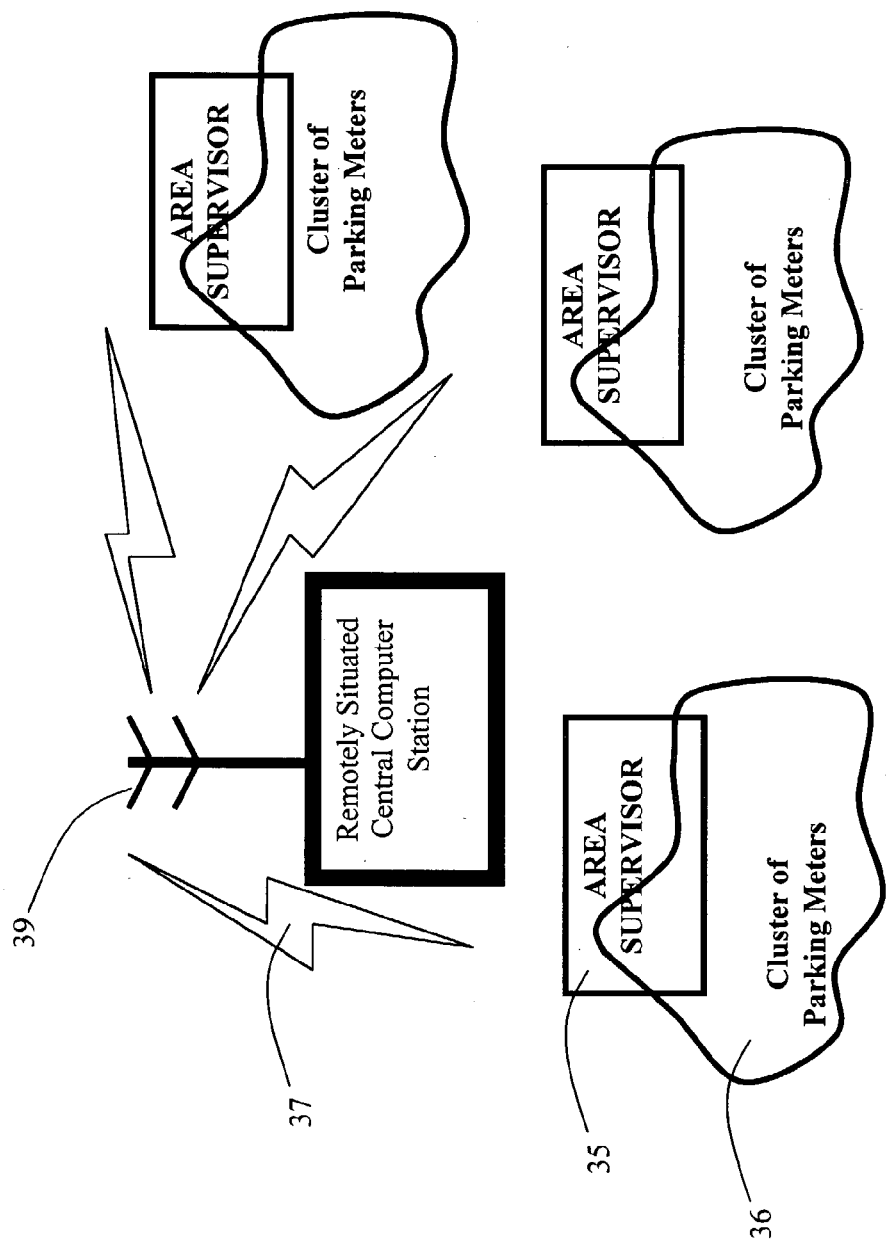
FIG. 4 is an overview diagram of one embodiment in which a remotely situated central computer station may communicate with the enhanced parking meter system of the present invention.
Figure 5A:
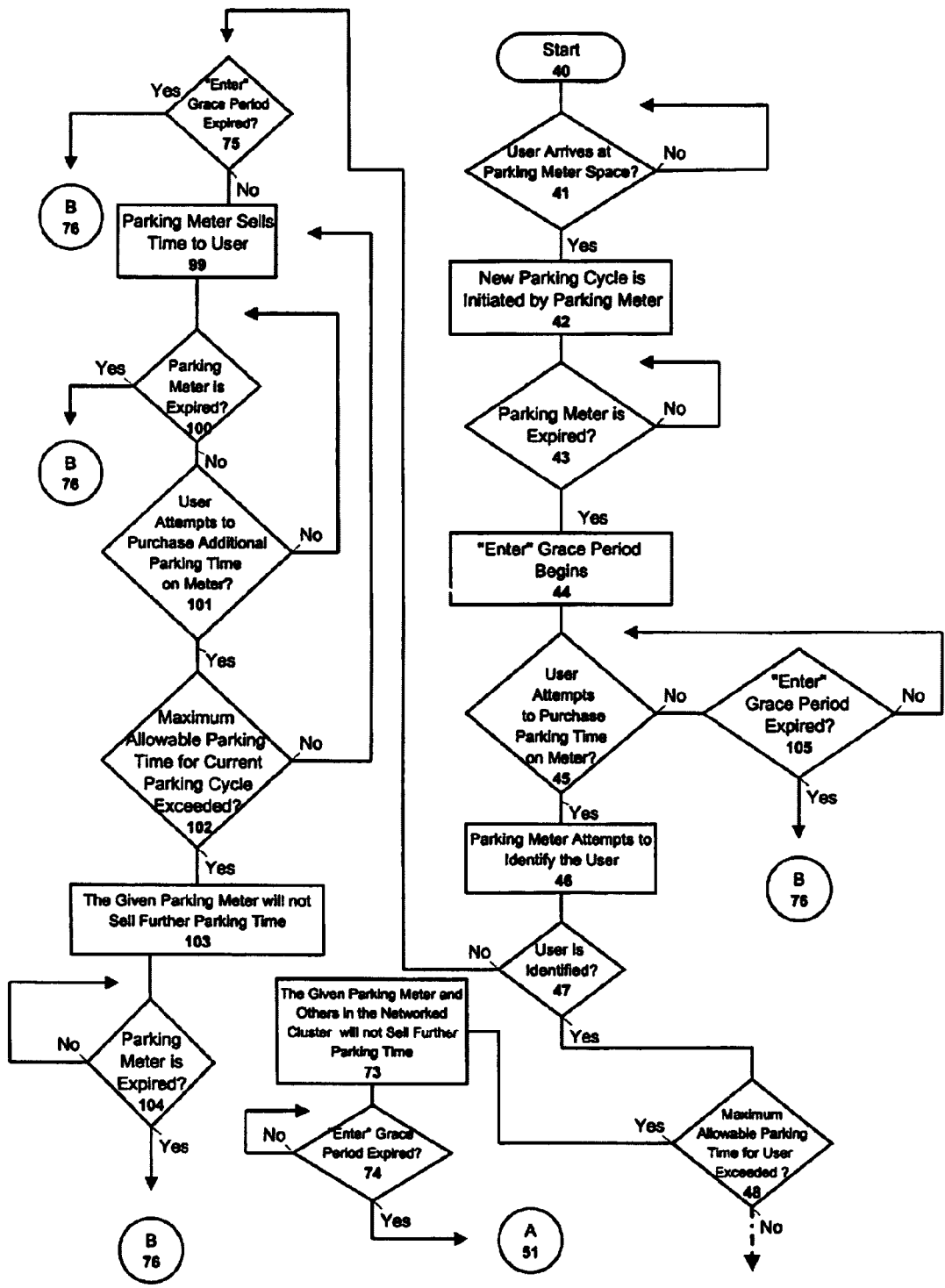
FIG. 5 is a block diagram showing one embodiment of the steps utilized by the enhanced parking meter system of the present invention.
Figure 5B:
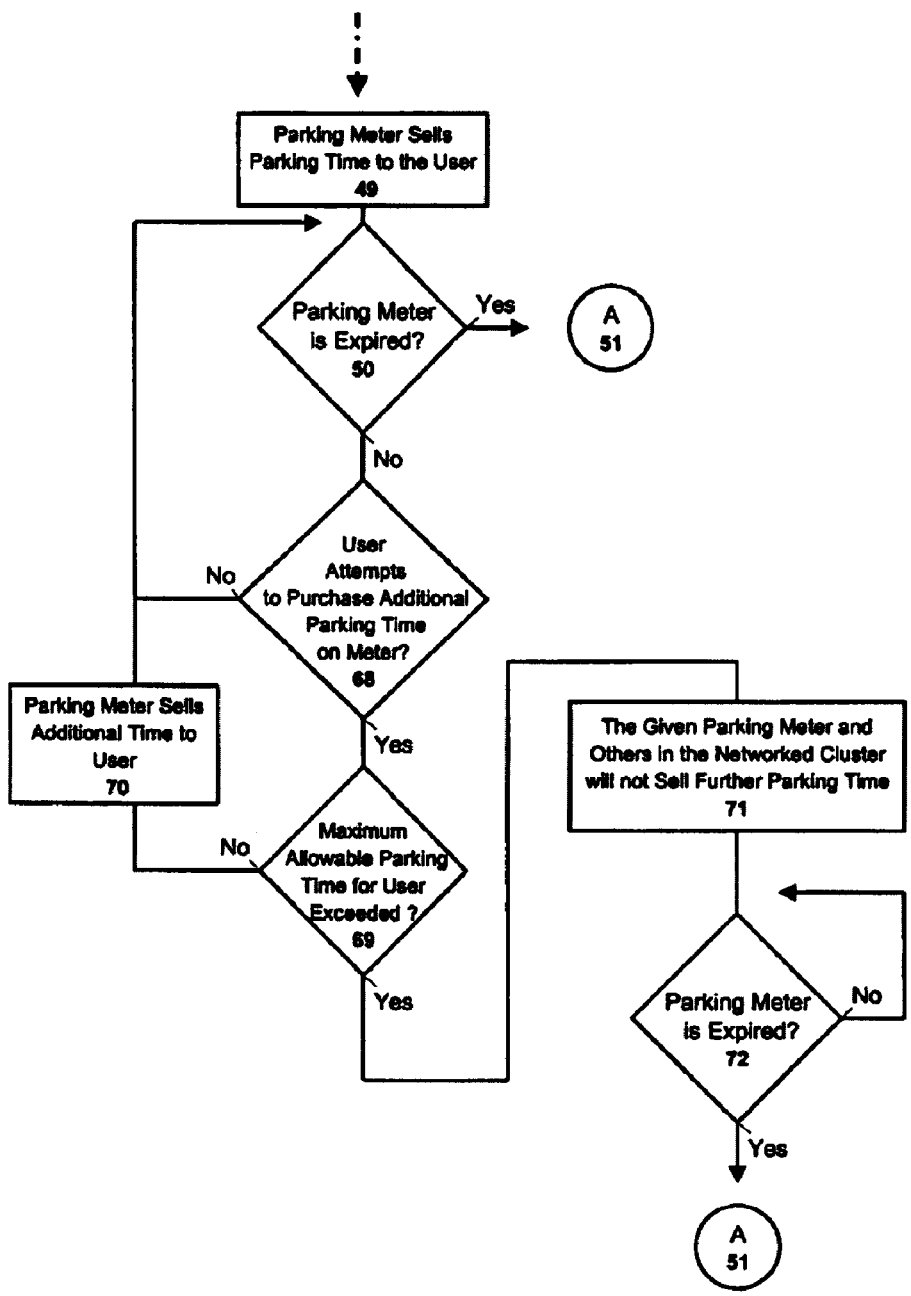
Figure 5C:
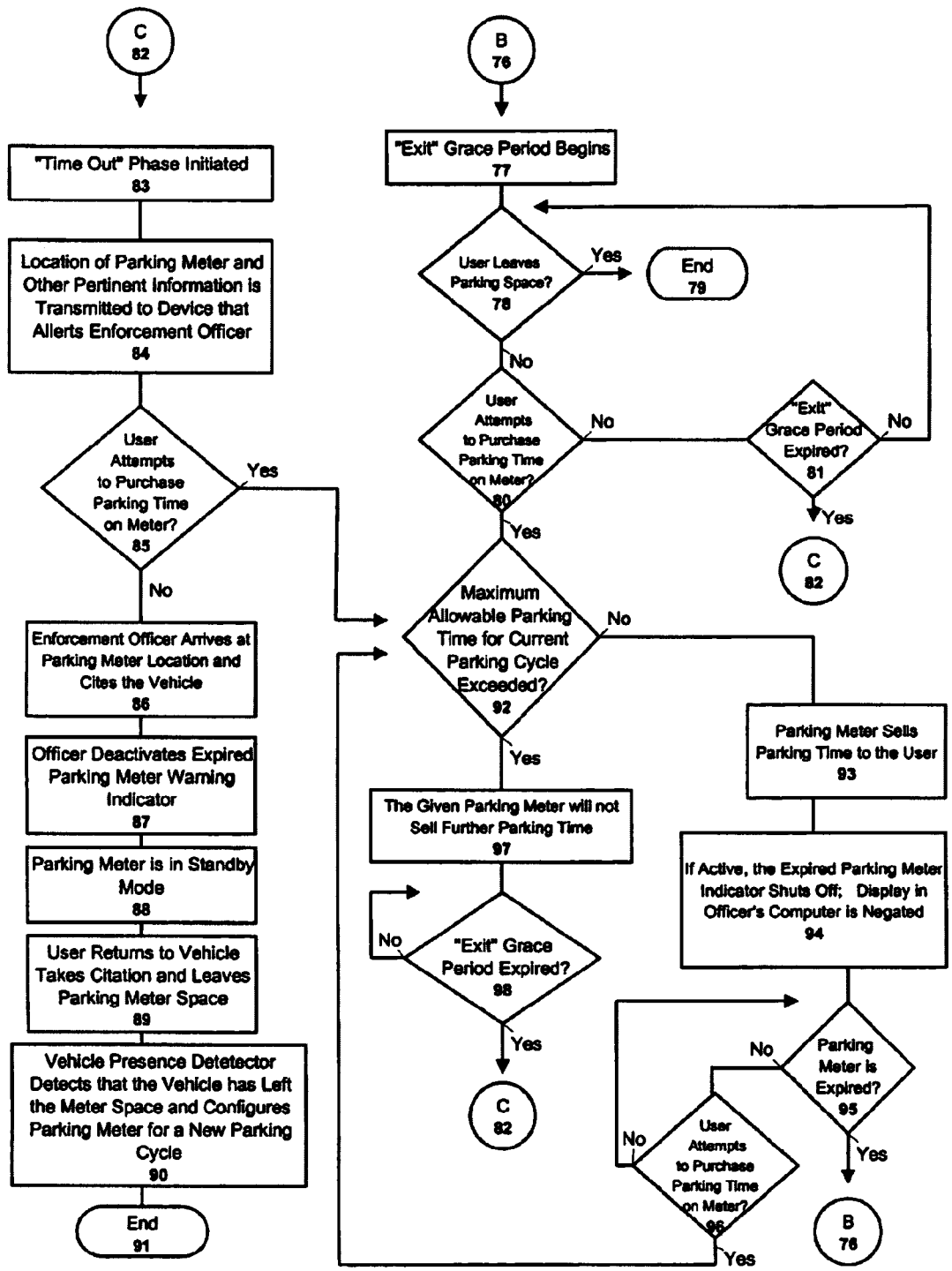
Figure 5D:
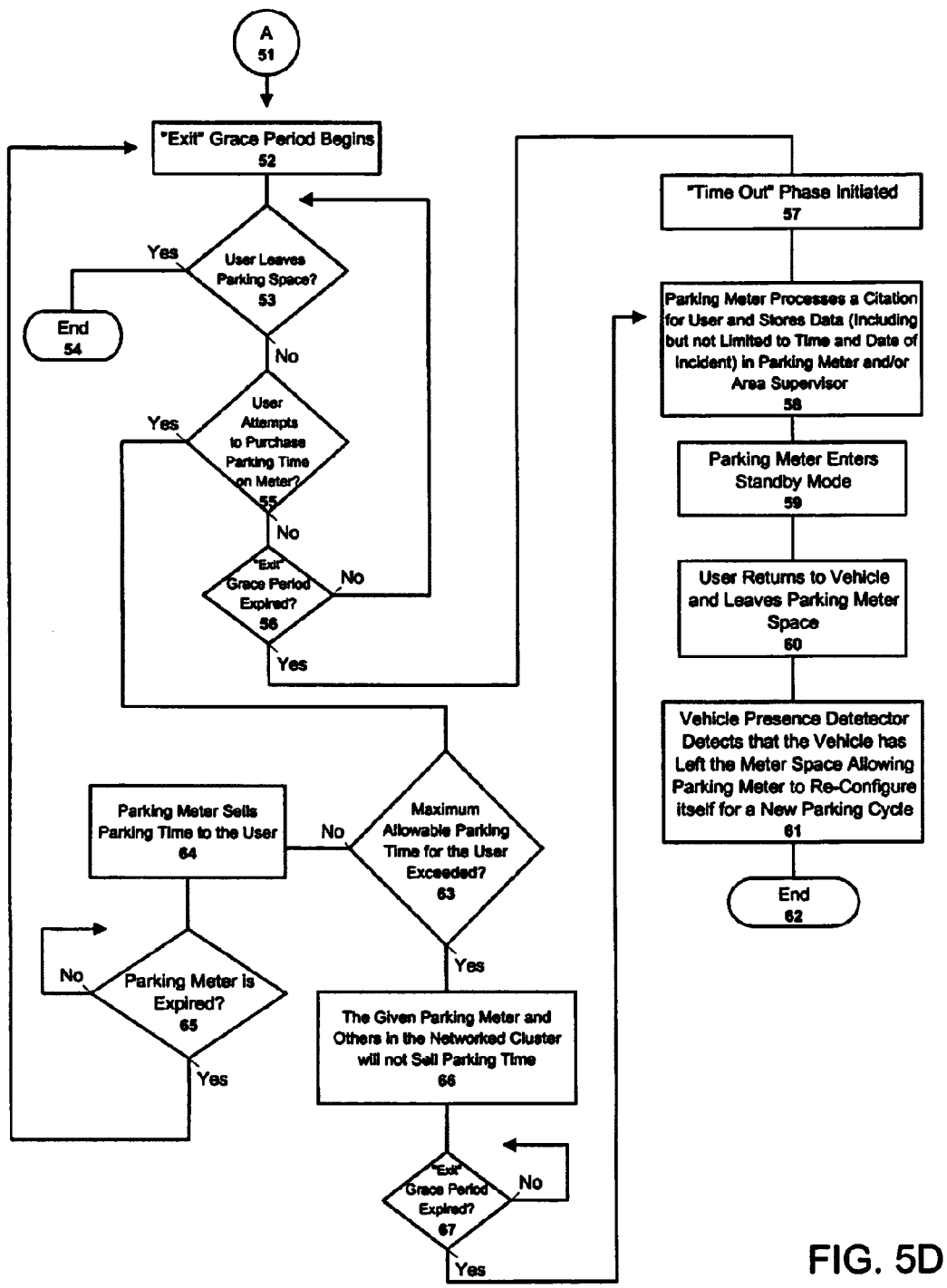

Communication of data to and from the parking meter 26 could be facilitated and enhanced using a transmitting/receiving medium (i.e. transceiver) such as an area supervisor 35. As shown in FIGS. 3 and 4, an area supervisor 35 is configured (i.e. networked) to transmit and receive data to and from a designated cluster of parking meters 36. Data transmitted from any parking meter 26 within the networked cluster may be received, processed, and/or stored by its designated area supervisor 35. Alternatively or in addition to, that data may be directly transmitted from the meter 26 to a mobile device retained by a parking enforcement officer 38 (e.g. hand held computer as shown in FIG. 3) or to a remotely situated central computer station 39 (as shown in FIG. 4). In a similar manner, the enforcement officer (via way of their mobile communication device(s) 38 or central computer station 39) may transmit data to the area supervisor 35 or directly to the meter 26, both of which may process-and/or store the data. It is further noteworthy that data may also be transmitted from the area supervisor 35 to the parking meter 26, or alternatively, from the area supervisor 35 to the parking enforcement (via way of their mobile hand held computer 38 or remotely situated central computer station 39). That data may thereafter be processed and/or stored by the receiving entity.

The area supervisor 35 is strategically positioned to communicate with a select cluster of parking meters 36 similarly located within a select geographic location. Strategic placement of the area supervisor 35 may be on an elevation such as on top of a building, telephone pole, etc. In addition to a transceiver, the area supervisor 35 may further contain data processing elements such as a microprocessor and a data storage element such as a hard drive and/or memory modules (not shown). It is noteworthy that a cluster of parking meters 36 may consist of two or more parking meters 26 situated in a proximate vicinity to one another. A proximate vicinity may include any geographic area having a distance in which all meters located within its radial bounds are able to effectively communicate to and from each other 26, the area supervisor 35, mobile communication device(s) retained by an enforcement officer 38, and/or a remotely situated central computer station 39. Furthermore, to avoid overburdening a particular area supervisor 35, additional area supervisors may similarly be positioned in select locations for communicating with a different cluster of parking meters. This is shown in both FIGS. 3 and 4 where three separate area supervisors manage the communication for three separate clusters of parking meters.

Use of an area supervisor 35 with the enhanced parking meter system of this invention is preferred since it offers significant advantages which enhance the effectiveness of the parking meter 26. An area supervisor 35 can network parking meters more effectively, thereby allowing them to better communicate and share data with each other. In this respect, the area supervisor 35 is used as a centralized element for processing, storing, and/or communicating data. For example, all data collected by a cluster of parking meters 36 can be transmitted to their designated area supervisor for storage and processing. Data accumulated in the area supervisor 35 may thereafter be conveniently downloaded by an enforcement officer 38 (arriving at the area supervisor 35 site) or by a remotely situated central computer station 39 (via wired or wireless transmission, or a combination of the two). The result is a significant savings in time and resources that would have been spent by arriving at each particular meter 26 in order to audit it and gather data. Second, use of an area supervisor 35 will also enable parking enforcement to more effectively limit the amount of time that any individual may park at a parking meter 26 within a designated cluster of parking meters 36 during the day, week, month, or year. This will eliminate current problems such as meter feeding and will be discussed later on in further detail. Third, the area supervisor 35 may drastically aid in conserving the power source of the parking meter 26 where such source is other then AC (e.g. battery). This is because mobile devices retained by a parking enforcement officer 38 as well as a remotely situated central computer station 39 may be distant from the parking meter 26. Direct wireless communication between these elements and the parking meter 26 will undoubtedly result in a substantial power drain on the parking meter's power source. By situating an area supervisor 35 in close proximity to a parking meter 26, power consumption from wireless transmission can be drastically reduced. The parking meter 26 will communicate with the area supervisor 35, which will in turn, communication with the enforcement officer's mobile device(s) 38 or remotely situated central computer station 39. Power drain on the area supervisor 35 will not be a crippling factor since a constant power supply (e.g. AC or solar power) will allow it to continuously relay data to and from the parking meter 26, irrespective of the transmission distance. It is noteworthy that the area supervisor 35 may communicate with the parking meter 26 and enforcement officer 38 (FIG. 3) or remotely situated central computer station 39 (FIG. 4) via wired, or preferably, wireless 37 transmission, or a combination of the two. Where an area supervisor 35 is not implemented, however, the parking meters 26 may communicate with each other as well as with a remotely situated central computer station 39 and any mobile devices possessed by enforcement staff operating in the field 38.

Besides efficiency in citation issuance, user identification technology may also be used to limit the amount of time that an individual and/or vehicle can park at a particular meter 26 or cluster of parking meters 36. Identification of a user and/or the vehicle that they are using will enable the parking meter 26 to track the total amount of parking time utilized by that individual and/or vehicle within a given period. If that time exceeds the predetermined allowable parking time for the day, week, month, or year, the meter 26 will refuse to sell any further time to the identified user. The refusal period will endure until the user and/or vehicle is once again within the permissible parking time limit. It is notable that the parking time limitation may be set for any period that is deemed appropriate for the intended use of the meter 26. For example, a municipality may limit a user and/or vehicle to two hours of parking time per day, 10 hours per week, and/or 40 hours per month. Alternatively, a private airport parking lot may allow a user and/or vehicle to park for two months straight (24 hours, 7 days a week) so long as the meter 26 remains un-expired.

Limiting parking time offers several advantages in parking enforcement and regulation. One such advantage is the ability to end egregious meter feeding which allows an individual to indefinitely park in a metered spot so long as they keep the meter in an un-expired state. This practice makes it difficult for a diverse population to enter a metered district where parking space is few and limited. By limiting the amount of time a user and/or vehicle can park in front of a meter, parking spaces for new traffic will become readily available. This will conveniently allow for a more diverse selection of individuals (e.g. shoppers, workers) to enter into and visit the commercial district. Limiting an individual's and/or vehicle's maximum parking time will also increase security within the metered district. After the tragic terrorist attacks of Sep. 11, 2001, it would be advantageous to limit the amount of parking time that a vehicle may remain parked near certain locations. Such locations include government facilities, airports, shopping districts, athletic stadiums, etc. If a vehicle remains parked in a metered space beyond the predetermined maximum time limit, an enforcement officer may be dispatched to investigate the scene.

Limiting a user's and/or vehicle's maximum parking time in front of a parking meter 26 may be accomplished in a number of ways. In a first embodiment, each individual meter 26 will independently track the amount of time an identified user and/or vehicle parked in front of it. If that same user and/or vehicle attempts to park at the same parking meter 26 for a period exceeding the meter's 26 allowable parking time limit, further payment for parking time from the user will be rejected by the meter 26. The same parking meter 26 will continue to reject payment until the identified user and/or vehicle is once again within the meter's allowable parking time limit.

In a second embodiment, all parking meters in a designated cluster 36 will be privy to the amount of parking time an identified user and/or vehicle consumed from any of the meters within the designated cluster or nearby cluster(s). If that same user and/or vehicle attempts to park or remain parked at any of the designated meters for a period that exceeds the allowable time for any one of the meters 26, further payment for parking will be refused by all of the designated meters. The refusal period will endure until the user and/or vehicle is once again within the permissible parking time limit. Limiting parking in this manner is made possible by enabling at least one cluster of parking meters 36 to commonly share information. This will allow all of the clustered meters to be informed of the identified user's and/or vehicle's parking activity as it occurs.

As previously mentioned, an area supervisor 35 can be used to network the cluster(s) of parking meters 36 together. An attempt to purchase parking time from any of the meters in a designated cluster 36 will be communicated to the appropriate area supervisor 35. The area supervisor 35 will in turn, track the total amount of parking time the identified user and/or vehicle has consumed. If the user and/or vehicle has not exceeded the maximum parking allowance for any meter 26 within the designated cluster(s) 36, the area supervisor 35 will allow the meter 26 to sell a permitted amount of parking time to the user. It is noteworthy that one area supervisor 35 may also communicate directly with another area supervisor 35 located in close proximity to it. This will allow proximately situated area supervisors to share data and keep better track of ongoing parking events. For example, if the municipality wishes to cumulatively limit a user's and/or vehicle's parking time for all clustered meters within a region controlled by 2 or more area supervisors, direct communication between all the area supervisors in that region would be desirable. Each would inform the other of the total time consumed by the user and/or vehicle in the region, thereby accurately instructing the given parking meter 26 whether the user and/or vehicle exceeded the allowable parking time limit. In the alternative, the same ends may be reached by having each area supervisor 35 communicate with the remotely situated central computer station 39. The computer station 39 would then relay the pertinent data to alternate area supervisors 35. Such a process, however, is inefficient in light of the approach utilizing direct communication between the area supervisors. Absent use of an area supervisor 35, individual meters 26 within a cluster of parking meters 36 may communicate directly with each other (and share information) upon initiation of a parking cycle by any identified user. Alternatively, each meter 26 may communicate with the remotely situated central computer station 36 which will appropriately share the data with other meters and keep them informed of the ongoing parking activities of identified users and/or vehicles.

In addition to limiting parking time for an individual and/or the vehicle they may utilize, the enhanced parking meter system of this invention may aid in law enforcement. By recognizing a particular user and/or vehicle, it would be able to compile data as to who was in a particular area during a particular time and date. Such data can be extremely useful to crime solving and leads investigation since it can point to wanted individuals and knowledgeable witnesses. For example, if "Tom Jones" is a wanted individual, law enforcement can enter his name and other personal identity data (e.g. driver license # "A588885") into the parking meter system data banks (e.g. data storage element of the remotely situated central computer station 39, area supervisor 35, and/or parking meter(s) 26). The instant that a parking meter 26 identifies an individual matching the identity of "Tom Jones", driver license # "A588885", an output signal (containing the suspect's identity and parked location) from the parking meter 26 or area supervisor 35 may be dispatched to law enforcement who can arrive at the scene and investigate. That identifying data can also be used as evidence (e.g. in court), at a later time, for pinpointing a user to a particular 13 location on a particular time and date.

Another advantage offered by the enhanced parking meter of this present invention is the ability to enforce and regulate parking within permit required parking districts or institutions. As previously mentioned, user data may include an individual's parking permit data (e.g. permit number) which was issued by the city or other entity. This permit allows its holder to park in a restricted location at times when parking, absent the permit, would entail a citation. By configuring the meter 26 to recognize or call up a user's permit data, the municipality or other entity (e.g. private) would be able to enforce parking without the need for an enforcement officer to routinely monitor the permit required. This is because a user's communication of user data would enable the meter 26 to determine whether the user and/or vehicle they utilized is permitted to park in the permit district/location. Here, the meter 26 may be programmed with data referencing all the valid permits issued and/or the users they were issued to. Alternatively, the area supervisor 35 and/or the parking enforcement (e.g. remotely situated central computer station 39) may possess such data and communicate it to the meter 26 at the appropriate time. If the user does not possess a valid parking permit, the meter 26 would refuse payment and preferably, warn the individual of a potential citation. It is worth mentioning that for this application, authorized parking may be solely conditioned upon the user having a valid permit rather then them purchasing parking time from the meter 26. As such, a user's valid permit status may satisfy the meter's 26 payment requirement and prevent it from entering into a time out phase. Should the meter 26 enter a time out phase (e.g. due to expiration caused by an invalid or outdated permit), however, a citation would be electronically processed and delivered to the user and/or owner of the vehicle. In the event that the user refuses to communicate their user data (into the meter 26), an enforcement officer will be dispatched upon initiation of a time out phase (as disclosed in U.S. Pat. No. 5,659,306).

The meter's 26 ability to recognize and retain user data may also provide a municipality and retail outlets with valuable information about the identified users of the meter 26. Additionally, such data may likewise lead to statistical data that pertains to the identified users' activities at the metered location. For example, data revealing who parked in a particular metered district (e.g. with reference to the person's age, sex, and address) may give the municipality a better understanding of the type of people that frequently visit the area. Such data may prove invaluable for demographic awareness as well as public and private business administration. Furthermore, such data may also help raise revenue and increase retail sales in the municipality district. This is because retail outlets and similar type advertisers may use the user and/or user activity statistical data to gain a better understanding of how to focus their ad campaigns. As an example to this scenario, if most visitors to the district are of a younger generation, advertisers may fashion their ads to appeal to a youthful crowd. Likewise, if the user data reveals that most visitors are commuters, advertisers may launch a media campaign in the visitors' district in order to further entice commute. Finally, identifying who visited a particular vicinity would also enable advertisers to send targeted advertisements to the identified individuals.

It is noteworthy that in certain situations, it would be beneficial to allow a user to park at the meter 26 without them having to make payment to it. This may be the case with private and even public entities who may want to provide free parking yet monitor and regulate the flow of customer traffic in and out of a particular outlet. At the same time, the meter(s) 26 may further be used to collect user data and statistics pertaining to a user's activities at the metered location. In such a scenario, the outlet (e.g. department store) may install a single or cluster of meters within or near its parking facility (i.e. lot) Each meter 26 within the cluster of meters 36 may correspond to a distinct parking space or alternatively, a single meter 26 may correspond to all parking spaces within the parking lot. Where a single meter 26 is used, placement of the meter 26 may be in any location within, near, or remote from the parking facility. Furthermore, where a single meter is used, the meter 26 may also be placed within the structure that the user intends to visit. Placement of the meter 26 within a structure is defined as any location that is inside or otherwise, part of the structure (e.g. department store). It is worth mentioning that the ability to place the meter 26 within (e.g. inside) a structure is especially desirable when retail outlets such as shopping malls are involved. This is because shopping malls tend to have a large number of individualized retail outlets situated in a common shopping facility. As such, the various outlets are forced to share a common parking lot with limited or no amount of parking spaces reserved for any particular outlet. Although a meter 26 situated outdoors may allow a user to indicate which outlet they came to visit (e.g. through electronic selection control element 29), configuration in such a manner would be inefficient and not user friendly. Alternatively, in such a case, it would be preferred that the meter 26 be placed inside the retail outlet so that there would be no confusion as to which outlet the user intended to visit.

Because expiration of the meter 26 (where payment is not required) may never occur, users may have to be given an incentive to communicate their user data into the meter(s) 26. One incentive, similar to those previously mentioned, pertains to "earned" benefits for retail merchandise. This may include, but is not limited to, discounts on merchandise prices (e.g. coupons), free-bees (e.g. select merchandise, gifts, food), earned store credit, etc. The "earned" benefit(s) may be stored (by the meter 26 or issuing entity such as a retail outlet) on the user's identification element (e.g. department store charge card). Alternatively, the benefit(s) may be credited to the user's personal "benefits" account which can be created for such a purpose. Finally, the "earned" benefits may be delivered to the identified user (e.g. in the form of products or redeemable coupons) via methods such as mail or e-mail.

Other types of incentives for a user to communicate their user data may further include limitation or preclusion of free parking time at the meter 26 or its corresponding parking facility. Here, if the user fails to communicate their user data, they may be given a limited or no period of free parking. The user may thereafter be charged by the parking facility for the time that their vehicle was parked within that facility. While user data may include various types of data, as mentioned above, statistical data pertaining to the user's activities at the metered location may include, but is not limited to, the number of times in which a user arrived at a particular meter location, the duration of time parked at the meter, the total amount of money they spent at a particular sales (e.g. retail) outlet, the name of the sales outlet visited, the "earned" benefits used by the user, the "earned" benefits unused by the user, etc. It is noteworthy that statistical data pertaining to the user's activities at the metered location may be generated by the parking meter 26 or its integrated network through analysis of communicated user data and/or other data associated with incentive(s) (e.g. "earned benefits") for a user to interact with the meter 26. Finally, data generated by and communicated to the meter(s) 26, in the scenario just discussed, may be collected and audited by private individuals vis-a-vis similar methods as described above (e.g. directly at the meter location, at the area supervisor 35 location, and/or at the remotely situated central computer station 39).

Where payment is required, it is preferred that the parking meter 26 be configured to accept payment via an electronic transaction rather then hard currency (i.e. coins/bills). This is because both the user data and parking payment may be stored on a common identification element (e.g. pre-paid parking card), as previously mentioned. As such, electronic payment is not only convenient, but also efficient. Additionally, electronic payment would allow a user to specify the exact amount of time they would like to purchase from the parking meter 26. In doing so, the user would avoid overpaying for unwanted parking minutes that are normally sold in block increments with use of hard currency. Exact time specification could be done by using electronic selection control element 29 on the parking meter 26 to select the desired amount of parking time. As a further incentive, it is notable that traditional collection of hard currency (i.e. coins) from parking meters is extremely time consuming, inefficient, and costly. Due to space constraints, meter maids must frequently service parking meters in order to empty their coin canisters. Since money is involved, extracted coin revenue must be closely monitored to ensure proper and un-tampered intake of municipality funds. Coin operated parking meters also have a tendency to jam during normal operation. Such occurrences always require dispatchment of an enforcement officer to render the parking meter functional. Finally, coin operated parking meters are subject to vandalism given the money that lays inside. The result of meter vandalism is not only the loss of the canister funds, but often, a total destruction of the parking meter which will need to be replaced.

It is finally notable that in certain cases, two or more parking meters may be pooled into a centralized meter unit (not shown) that controls the parking cycle of all pooled meter units. Here, each parking space is assigned a unique identification number which pertains to a distinctive parking cycle that is controlled by the centralized unit. In such a case, the presence of the user's vehicle may be detected by presence sensors resident in the parking space, or alternatively, by virtue of the user's interaction with the centralized meter unit (e.g. communication of their user data into the meter unit, purchase of parking time, etc.). Additionally, any of the above mentioned functions and elements of either the meter 26 and/or the area supervisor 35 may be integrated into the centralized meter unit. This will result in an inclusive parking management unit which may have all the efficiencies offered by the enhanced parking meter system of this present invention.

FIG. 5 shows a block diagram illustrating one embodiment of the steps utilized by the enhanced parking meter system of the present invention. It is noteworthy that the parking meter 26 in this example is one parking meter in a cluster of parking meters 36 managed by an area supervisor 35. Additionally, the embodiments in FIG. 5 assume a cumulative two hour per day maximum parking time limit in front of any parking meter 26 within the given cluster of meters 36.

Beginning from block 40, if the user arrives at the parking meter space, block 41, a new and active parking cycle will be initiated by the parking meter 26, block 42. The user may park their vehicle in the metered space until any unused time remaining on the meter 26 is consumed, block 43. At that point, if the vehicle utilized by the user is still in the metered space, an "enter" grace period, block 44, will begin. The "enter" grace period will give the user sufficient time to pay for parking at a zeroed out meter prior to initiation of a time out phase. If the user attempts to purchase parking time on the meter 26 (e.g. via use of pre-paid parking card), block 45, the meter 26 will attempt to identify the user, block 46. Identification of the user and/or the vehicle they are in may be accomplished by retrieving the user's data which was stored on their identification element (e.g. the pre-paid parking card, mobile transmitter, a cellular telephone, or a hand-held PC).

Assuming that the user is identified, block 47, the meter 26 will check whether the maximum allowable parking time (two hours) for the user was exceeded, block 48. If not, the parking meter 26 will sell an amount of parking time that does not exceed the user's predetermined maximum limit, block 49. The amount of time purchased by the user will thereafter be recorded by the meter 26 and/or communicated to the area supervisor 35 and/or the remotely situated central computer station 39. The user may remain in the parking space until it is expired, block 50, at which time the parking meter 26 will initiate a sequence of events marked by reference character "A", block 51.

As indicated by block 51, the meter 26 will begin an "exit" grace period, block 52, which will give the user time to purchase more parking minutes or leave the parking space. Here, a warning message may be displayed to the user, via the meter's LCD 27, instructing them of the present situation. If the user decides to leave the space, block 53, the parking cycle ends, block 54, and the meter 26 reconfigures itself for a new parking cycle. If however, the user declines to leave, block 53, or fails to purchase parking minutes, block 55, and the "exit" grace period expires, block 56, the parking meter will initiate a "time out" phase, block 57. There, a citation will be processed and stored in the parking meter 26 for the user, block 58. Preferably, the citation data (which preferably contains the user data, time, date, and reason for citation) will be transmitted to the area supervisor 35 where it may likewise, be stored until audited (downloaded) by enforcement staff and later delivered to the user. At this point, the parking meter 26 will enter standby mode, block 59, until the user returns to their vehicle and leaves the parking meter space, block 60. The parking meter LCD 27 may thereafter display the message, "Vehicle Cited" in order to inform the user of the issued citation. Departure of the vehicle will be detected by the vehicle presence detector 31, 13 after which, the parking meter 26 will reconfigure itself for a new parking cycle, block 61, thereby ending the previous one, block 62.

As previously mentioned, however, the user may have attempted to purchase additional parking time on the meter 26, block 55, prior to the expiration of the "exit" grace period, block 56. In that scenario, the meter 26 would again, check whether the maximum allowable parking time for the user was exceeded, block 63. If not, the meter 26 will sell an amount of parking time that does not exceed the user's maximum parking limit, block 64. The user may remain parked in the space until he/she leaves or the meter 26 becomes expired, block 65, at which time, the sequence of events indicated by reference character "A", block 51, will once again begin. It is noteworthy that since the parking meter 26 identified the user, the maximum allowable time limit for that user (e.g. two hours per day) will be enforced by all the meters in the networked cluster 36. This is because the meters 26 within the designated cluster 36 may exchange data to and from the area supervisor 35. As such, each time the user attempts to park in front of any meter in the networked cluster 36, the area supervisor 35 will receive such data and determine whether the user's allowable parking time has been exceeded. If so, other meters in the networked cluster 36, in addition to the current meter, will be instructed to refuse to sell the user any parking time, block 66. This status may be displayed to the user, via the meter's LCD 27, in the form of a warning message, instructing them to leave the space or be cited when the "exit" grace period expires. If the user remains parked in the metered space after the "exit" grace period expires, block 67, the meter 26 will initiate a time out phase, block 57, whereby a citation will be processed as per blocks 58, 59, 60, 61, and 62, and later delivered to the user.

Backtracking to block 50 in FIG. 5, if the time initially purchased from the meter 26 did not expire, the user could have attempted to purchase additional parking time, block 68. Since the user was identified by the meter 26, the meter would check whether the maximum allowable parking time for the user was exceeded, block 69. If not, the meter 26 will sell an amount of parking time that does not exceed the user's maximum parking limit, block 70. If yes, however, the given meter 26 and others in the networked cluster 36 will refuse to sell further parking time, block 71. After the time remaining on the meter 26 expires, block 72, the sequence of events indicated by reference character "A", block 51, will begin.

It is noteworthy that the meter 26 may also refuse to sell parking time to the user right after his/her initial identification, block 47. This situation is likely to occur when the maximum allowable parking time for that user was exceeded, block 48. For example, a user may have exceeded their allowable parking limit for the day and is attempting to park within the same clustered network of meters 36 during that same day. In such case, the given parking meter 26 and others in the networked cluster 36 will reject the purchase transaction and not sell further parking time to the identified user, block 73. If the user fails to remove their vehicle by the time that the "enter" grace period expires, block 74, the sequence of events indicated by reference character "A", block 51, will begin.

Returning once again to block 47, FIG. 5, a scenario where the user is not identified by the parking meter 26 is further contemplated. In such a case, once the "enter" grace period expires, block 75, the sequence of events referenced under character "B", block 76 will ensue. At that point, an "exit" grace period will begin, block 77. As was previously the case, a warning message may be displayed to the user, via the meter's LCD 27, instructing them of the present situation. If the user leaves the parking space, block 78, the cycle will end, block 79. Alternatively, the user may attempt to purchase parking time from the meter 26, block 80. If the user does neither and the "exit" grace period expires, block 81, the parking meter 26 will initiate a sequence of events, indicated by character "C", block 82, leading to a citation.

At block 83, the meter 26 will enter into a "time out" phase, whereby the location and other pertinent information (e.g. time, date, parking cycle statistics, etc. . . . ) relating to the incident will be transmitted 34 to a device that can alert parking enforcement, block 84. Transmission 34 of the warning message will preferably be sent through wireless technology, directly to the field officer 38 (via a mobile computer such as a "Husky®" hand held) or alternatively, to a remotely situated central computer station 39 which will relay the message to the officer. Assuming that the user does not attempt to purchase parking time on the meter, block 85, an enforcement officer will arrive at the parking meter location and cite the illegally parked vehicle 86. At that point, the officer will deactivate the expired parking meter warning indicator, block 87, so that another officer will not arrive to cite the vehicle for the same offense. Again, the message, "Vehicle Cited" may be displayed by the LCD 27 in order to provide further indication that the vehicle has been cited. Thereafter, the parking meter will remain in standby mode, block 88, until the user returns to the vehicle, takes the citation, and leaves the parking meter space, block 89. When the vehicle presence detector 31 detects that the vehicle has left the metered space, it will allow the meter 26 to re-configure itself for a new parking cycle, block 90. At that point, the cycle will end, block 91.

Returning to block 85, it is also contemplated that the user may attempt to purchase parking time from the meter 26 prior to the arrival of the enforcement officer. In such a scenario, the meter 26 will check whether the maximum allowable parking time for the current parking cycle was exceeded, block 92. It is noteworthy that although the meter 26 has not identified the user, it can still be programmed to allow for a maximum amount of time in which any vehicle in front of it can park. This predetermined limit will be reset (i.e. restarted at 0:00) each time a new parking cycle begins. Thus, if the maximum time limit for the day is set at 2 hours, each time the meter 26 initiates a new parking cycle, the time used by the previous vehicle will be reset to 0.

With reference to the diagram again, if the maximum allowable parking time has not been exceeded, block 92, the parking meter 26 will sell the user additional parking time, block 93. At that point, the "time out" signal will be cancelled, whereby the "Expired Parking Meter Indicator" will shut off and alert the enforcement officer not to arrive at the meter, block 94. This may be done by having the meter 26 transmit 34 a second message directly to the officer via their mobile device 38 (e.g. hand held computer) instructing that the meter 26 is in valid status. Alternatively, the meter 26 may transmit 34 the message to the remotely situated central computer station 39 which may in turn, relay the status to the officer in the field. The user may thereafter, remain parked at the metered space until the meter 26 once again, becomes expired, block 95. During this period, the user may again attempt to purchase additional parking time, block 96 and undergo the process leading from block 92. However, when the parking meter 26 becomes expired, block 95, the sequence of events indicated by reference character "B", block 76, will again commence, thereby beginning a new "exit" grace period, block 77. It is noteworthy that if the maximum allowable parking time for the current cycle has been exceeded, block 92, the given meter 26 will refuse to sell the user further parking time, block 97. Again, a warning message may be displayed by the meter LCD 27, instructing the user to leave the space or be cited when the "exit" grace period expires. After the "exit" grace period expires, block 98, the process denoted by reference character "C", block 82, will initiate.

Returning now to FIG. 5, block 47, if the user was not identified, and the "enter" grace period does not expire, block 75, the meter 26 will sell parking time to the user, block 99. This is because the user has begun a new perking cycle at a meter 26 that does not have a record of the amount of parking time the user consumed. However, as previously mentioned, the amount of time sold would be limited to the maximum allowable time limit for each new parking cycle. When the purchased time expires, block 100, the events marked by reference character "B", block 76 would thereafter, ensue. During the time when the meter 26 is not expired, the user may purchase additional parking time, block 101, up to the maximum allowable limit, block 102. Once that limit is reached, however, the given parking meter 26 will not sell the user further parking time, block 103. At the moment of expiration, block 104, the sequence of events marked by reference character "B", block 76 will ensue. It is noteworthy that upon initial entry into the parking space, a similar course of events will occur if the user refuses to purchase parking time on the meter 26, block 45. There, once the "enter" grace period expires, block 105, the course of events marked by reference character "B", block 76, will ensue.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. A parking meter system to discourage a user from parking a vehicle in at least one parking space beyond a maximum parking time, comprising:
   a. at least one parking space, each parking space having a parking meter associated therewith;
   b. each parking meter associated with a detector for detecting the presence of a vehicle in said parking space;
   c. each parking meter associated with a data receiving element for receiving identifying data relative to the use of said parking space;
   d. each parking meter associated with a payment receiving element responsive to a payment made by said user of said parking space;
   e. a data processor capable of detecting that said user is attempting to park within said parking space beyond a predetermined maximum time allowance, said data processor causing said parking meter to refuse further payment from said user.

2. The parking meter system of claim 1, further comprising: a data storage element which stores said identifying data.

3. The parking meter system of claim 1, wherein said system provides said identifying data to law enforcement officials, thereby aiding law enforcement in locating individuals or vehicles identified by said system.

4. The parking meter system of claim 1, wherein said system collects identifying data from users of said system.

5. The parking meter system of claim 1, wherein said system collects statistical data pertaining to users of said at least one parking space.

6. The parking meter system of claim 1, wherein said payment is made to said system via an electronic transaction.

7. The parking meter system recited by claim 1 wherein said data receiving element and said payment receiving element are collectively comprised by an electronic reader which senses both the identifying data and payment authorization.

8. The parking meter system recited by claim 1 wherein said identifying data identifies a person wishing to use said at least one parking space.

9. The parking meter system recited by claim 1 wherein said identifying data identifies the vehicle currently occupying said at least one parking space.

10. The parking meter system recited by claim 1 further comprising:
    a. a remote computer remotely situated from said parking space; and
    b. a transmitter generally proximate to said at least one parking space which transmits data to said remote computer.

11. The parking meter system recited by claim 1, wherein said data receiving element is a data card reader.

12. The parking meter system recited by claim 1 further comprising: an identification element containing said identifying data, said identification element being kept within the possession of said user.

13. The parking meter system recited by claim 12, wherein said identification element comprises a pre-paid parking card.

14. The parking meter system of claim 13, wherein said pre-paid parking card includes a payment source for purchasing parking time from said system.

15. The parking meter system recited by claim 12, wherein said identifying data includes the user's address.

16. The parking meter system recited by claim 1, wherein a new parking control cycle is initiated upon detection of a new vehicle entering said parking space.

17. The parking meter system recited by claim 1 wherein said system detects that said user has exceeded their allowable parking time limit and causes a parking violation citation to be issued without the need for an enforcement officer to physically arrive at said parking space.

18. The parking meter system recited by claim 17 wherein said parking violation citation is printed remote from said at least one parking space for subsequent delivery to the user of said parking space.

19. The parking meter system recited by claim 17 further comprising: a printing element generally proximate to said at least one parking space, said printing element capable of printing said parking violation citation for delivery to said user of said parking space.

20. The parking meter system recited by claim 1, wherein said system provides enforcement of restricted district permit parking by refusing payment from users who are not authorized to park in said at least one parking space.

21. The parking meter system recited by claim 1, wherein said system generates statistical data pertaining to ongoing parking cycles which occur at said at least one parking space over a predetermined period of time.

22. The parking meter system recited by claim 1, wherein said detector, data receiving element, payment receiving element, and data processor, comprise an independent enhancement unit for installation onto an existing parking meter.

23. A method for limiting the duration in which a user of a first parking meter associated with a first parking space may park at said first parking meter, said method comprising the steps of:
    a. receiving identifying data from the user of the first parking space;
    b. allowing said user to pay for a parking cycle; and
    c. rejecting additional payment made to said first parking meter when conditions indicate that said user has exceeded a maximum allowable parking time limit at said first parking meter.

24. The method recited by claim 23 including the further step of detecting the presence of a vehicle within the first parking space.

25. The method recited by claim 23 including a plurality of secondary parking meters associated respectively with a plurality of secondary parking spaces within a vicinity of said first parking space, further including the steps of:
  d. receiving identifying data from the user of each of the secondary parking spaces;
  e. determining whether said user has exceeded a maximum allowable parking time limit at said first parking space; and
  f. causing each of said secondary parking meters to refuse further payment by said user if said user has exceeded a maximum allowable parking time limit at said first parking space.

26. A parking meter system to discourage a user from parking a vehicle within a group of parking spaces beyond a maximum parking time, comprising:
  a. a plurality of parking spaces forming a group, each such parking space having a parking meter associated therewith;
  b. each parking meter associated with a detector for detecting the presence of a vehicle in each such parking space;
  c. each parking meter associated with a data receiving element for receiving identifying data relative to the use of such parking space;
  d. each parking meter associated with a payment receiving element responsive to a payment made for parking a vehicle at each such parking space;
  e. a communication network coupling the plurality of parking meters together, said communication network being able to detect that said user is attempting to park within the group of parking spaces beyond a maximum permitted duration, said communication network causing said plurality of parking meters to refuse further payment from said user.

27. The parking meter system recited by claim 26 wherein said communication network further comprises:
  a remote computer remotely situated from said parking meter system, said remote computer capable of communicating data with said plurality of parking meters.

28. The parking meter system recited by claim 26 wherein said data receiving element and said payment receiving element are collectively comprised by an electronic reader which senses both the identifying data and payment authorization.

29. The parking meter system recited by claim 26 wherein said identifying data identifies a person wishing to use said at least one parking space.

30. The parking meter system recited by claim 26 wherein said identifying data identifies the vehicle currently occupying said at least one parking space.

31. The parking meter system recited by claim 26, wherein said data receiving element is a data card reader.

32. The parking meter system recited by claim 26 further comprising: an identification element containing said identifying data, said identification element being kept within the possession of said user.

33. The parking meter system recited by claim 32, wherein said identification element comprises a pre-paid parking card.

34. The parking meter system of claim 33, wherein said pre-paid parking card includes a payment source for purchasing parking time from said system.

35. The parking meter system recited by claim 32, wherein said identifying data includes the user's address.

36. The parking meter system recited by claim 26, wherein a new parking control cycle is initiated upon detection of a new vehicle entering each of said plurality of parking spaces.

37. The parking meter system recited by claim 26 wherein said system detects that said user has exceeded their allowable parking time limit and causes a parking violation citation to be issued without the need for an enforcement officer to physically arrive at said parking space.

38. The parking meter system recited by claim 37 wherein said parking violation citation is printed remote from said plurality of parking spaces for subsequent delivery to the user of said plurality of parking spaces.

39. The parking meter system recited by claim 37 further comprising: a printing element generally proximate to said plurality of parking spaces, said printing element capable of printing said parking violation citation for delivery to said user of said plurality of parking spaces.

40. The parking meter system recited by claim 26, wherein said system provides enforcement of restricted district permit parking by refusing payment from users who are not authorized to park in any of said plurality of parking spaces.

41. The parking meter system of claim 26, wherein said system generates statistical data pertaining to ongoing parking cycles which occur at each of said plurality of parking spaces over a predetermined period of time.

42. The parking meter system recited by claim 26, wherein said detector, data receiving element, and payment receiving element comprise an independent enhancement unit for installation onto an existing parking meter.

43. The parking meter system of claim 26, further comprising: a data storage element which stores said identifying data.

44. The parking meter system of claim 26, wherein said system provides said identifying data to law enforcement officials, thereby aiding law enforcement in locating individuals or vehicles identified by said system.

45. The parking meter system of claim 26, wherein said system collects identifying data from users of said system.

46. The parking meter system of claim 26, wherein said system collects statistical data pertaining to users of said at least one parking space.

47. The parking meter system of claim 26, wherein said payment is made to said system via an electronic transaction.

48. A parking meter system for limiting the time duration in which an individual may park at least one parking meter comprising:
  a. a data receiving element associated with at least one parking meter and generally proximate to at least one parking space which receives identifying data relative to the use of said at least one parking space;
  b. a payment receiving element associated with at least one parking meter and generally proximate to said at least one parking space which is responsive to a payment made for parking a vehicle at said at least one parking space; and
  c. a data processor associated with said at least one parking meter that allows for the rejection of additional payment made to said at least one parking meter when conditions indicate that said user has exceeded a predetermined maximum allowable parking time limit.

49. The parking meter system recited by claim 48, wherein said at least one parking meter is networked with another of said at least one parking meter.

50. The parking meter system recited by claim 48, wherein said system comprises an add-on attachment unit to an existing parking meter.

51. A method of discouraging a user from parking a vehicle within a group of parking spaces beyond a maximum parking time, said method comprising the steps of:
  a. providing a parking meter associated with each of a plurality of parking spaces forming said group of parking spaces;
  b. providing a data receiving element associated with each of said parking meter for receiving identifying data relative to the use of said parking space;
  c. providing a payment receiving element associated with each of said parking meter responsive to a payment made for parking a vehicle at each such parking space;
  d. networking the plurality of parking meters together; and
  e. detecting that the user is attempting to park within the group of parking spaces beyond a maximum permitted duration, and causing each of the plurality of parking meters to refuse further payment from such user.

52. The method recited by claim 51 including the further step of providing a detector associated with each parking meter for detecting the presence of a vehicle in each of said parking space.

53. A method for limiting the duration in which a user of a parking meter associated with a plurality of parking spaces may park at said meter, said method comprising the steps of:
  a. receiving identifying data from the user of the parking meter;
  b. allowing said user to pay for a parking cycle; and
  c. rejecting additional payment made to said parking meter when conditions indicate that said user has exceeded a maximum allowable parking time at said parking meter.

54. The method of claim 53 including the further step of detecting the presence of a vehicle within at least one of said plurality of parking spaces.

* * * * *